United States Patent
Lim et al.

(10) Patent No.: US 8,279,354 B2
(45) Date of Patent: Oct. 2, 2012

(54) APPARATUSES AND METHODS FOR PROCESSING VIDEO SIGNALS

(75) Inventors: Hyung-jun Lim, Suwon-si (KR); Sung-cheol Park, Seongnam-si (KR); Jae-hong Park, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1409 days.

(21) Appl. No.: 11/700,908

(22) Filed: Feb. 1, 2007

(65) Prior Publication Data

US 2007/0247546 A1 Oct. 25, 2007

(30) Foreign Application Priority Data

Feb. 2, 2006 (KR) .................. 10-2006-0010094

(51) Int. Cl.
*H04N 9/64* (2006.01)

(52) U.S. Cl. ........ 348/715; 348/714; 348/448; 348/450; 348/663; 348/659; 348/725; 348/726; 348/727; 348/638; 345/603; 345/604

(58) Field of Classification Search .................. 348/448, 348/450, 663, 715, 714, 659, 725, 726, 727, 348/638; 345/603, 604
See application file for complete search history.

(56) References Cited

U.S. PATENT DOCUMENTS

| 6,091,458 | A * | 7/2000 | Jeon et al. ...................... 348/554 |
| 6,894,726 | B2 | 5/2005 | Carlsgaard et al. |
| 7,468,754 | B2 | 12/2008 | Carlsgaard et al. |
| 7,907,216 | B2 * | 3/2011 | Choi ............................. 348/627 |
| 2002/0041332 | A1 * | 4/2002 | Murata et al. .................. 348/272 |
| 2002/0080268 | A1 | 6/2002 | Willis |
| 2004/0004672 | A1 | 1/2004 | Carlsgaard et al. |
| 2004/0179141 | A1 * | 9/2004 | Topper ......................... 348/663 |
| 2005/0162549 | A1 * | 7/2005 | Carlsgaard et al. ........... 348/448 |
| 2006/0077293 | A1 * | 4/2006 | Willis ............................ 348/448 |
| 2006/0285010 | A1 * | 12/2006 | Wang et al. .................... 348/452 |

FOREIGN PATENT DOCUMENTS

| CN | 1666515 | 9/2005 |
| JP | 2002-354267 | 12/2002 |
| JP | 2002-369218 | 12/2002 |
| KR | 1019930000463 B1 | 1/1993 |
| KR | 1998-071354 | 10/1998 |
| KR | 10-2000-0060997 | 10/2000 |
| WO | WO 2004/006577 A1 | 1/2004 |

* cited by examiner

*Primary Examiner* — Jefferey Harold
*Assistant Examiner* — Mustafizur Rahman
(74) *Attorney, Agent, or Firm* — Harness, Dickey & Pierce, PLC (57) ABSTRACT

A video signal processing apparatus may include a frame memory and a separator and deinterlacer circuit. The frame memory may store an interlaced video signal. The separator and deinterlacer circuit may execute operations of separating and deinterlacing the interlaced video signal stored in the frame memory. The apparatus may output a sequential video signal. A data processing system may include the video signal processing apparatus. A method for processing video signals may include storing an interlaced video signal in a frame memory and executing operations of separating and deinterlacing the interlaced video signal stored in the frame memory. The method may also include outputting a sequential video signal.

23 Claims, 6 Drawing Sheets

Fig. 1A

(CONVENTIONAL ART)

Top Field      Bottom Field

APPARATUSES AND METHODS FOR PROCESSING VIDEO SIGNALS

PRIORITY STATEMENT

This application claims priority from Korean Patent Application No. 10-2006-0010094, filed on Feb. 2, 2006, in the Korean Intellectual Property Office (KIPO), the entire contents of which are incorporated herein by reference.

BACKGROUND

1. Field

Example embodiments relate to apparatuses and methods for processing video signals. Also, example embodiments relate to apparatuses and methods for processing operations to separate and deinterlace luminance and chrominance signals using a single frame memory.

2. Description of Related Art

Scanning video signals in television systems are generally carried out in a progressive or interlaced scanning mode. The progressive scanning mode sequentially scans all horizontal scanning lines included in a given frame. In contrast, the interlaced scanning mode scans half of the horizontal scanning lines in a given frame at a time. For example, the interlaced scanning mode may first scan the odd-numbered scanning lines and then scan the even-numbered scanning lines.

Figure 1A:
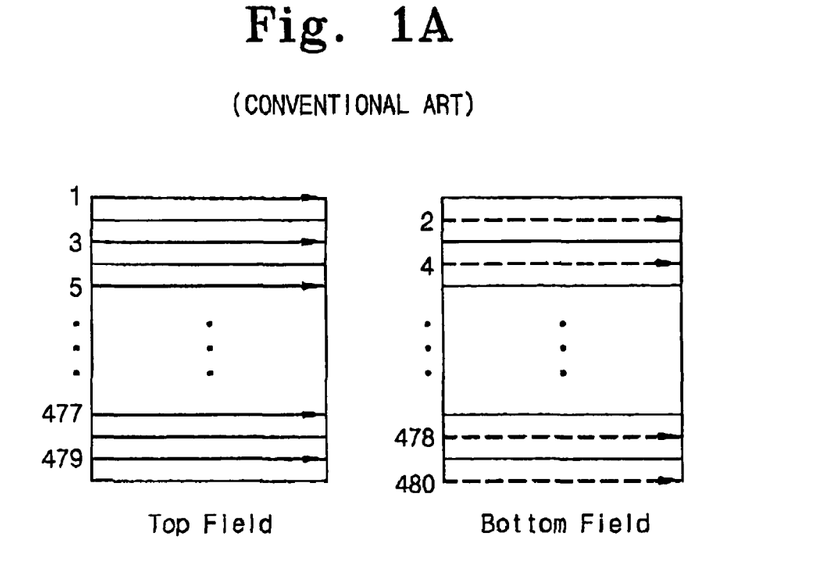
FIG. 1A is a schematic diagram of an example interlaced scanning mode.

FIG. 1A is a schematic diagram of an example interlaced scanning mode. Referring to FIG. 1A, a display apparatus using the interlaced scanning mode—such as an analog television set—displays one field at desired intervals (i.e., about every $60^{th}$ of a second). For example, an analog television alternately scans the top field composed of the odd-numbered scanning lines (1, 3, 5, ..., 477, and 479) and the bottom field composed of the even-numbered scanning lines (2, 4, 6, ..., 478, and 480), each field being scanned about every $60^{th}$ of a second. A single frame is composed of a combination of the top and bottom fields. Thus, the analog television displays one frame about every $30^{th}$ of a second.

Figure 1B:
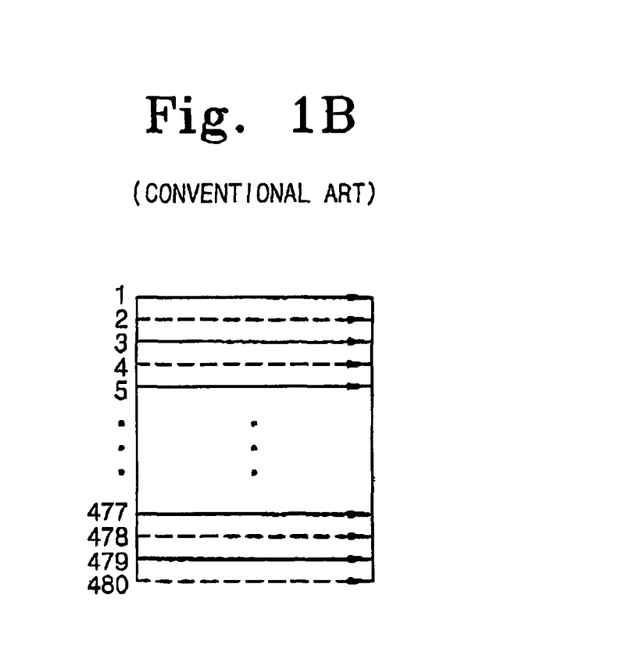
FIG. 1B is a schematic diagram of an example progressive scanning mode.

FIG. 1B is a schematic diagram of an example progressive scanning mode. Referring to FIG. 1B, a display apparatus using the progressive scanning mode—such as a computer monitor or digital television-displays one frame at desired intervals (i.e., about every $60^{th}$ of a second). For example, the computer monitor or digital television sequentially scans all of the scanning lines (1-480) about every $60^{th}$ of a second.

As such, the progressive and interlaced scanning modes process the scanning lines of a frame differently. Therefore, a display apparatus using the interlaced scanning mode cannot display an image in the progressive scanning mode. Similarly, a display apparatus using the progressive scanning mode cannot display an image in the interlaced scanning mode.

The present standards for television systems—such as NTSC (National Television System Committee), PAL (Phase Alternation Line), SECOM (Sequential Couleur Avec Memoire)—use the interlaced scanning mode. Thus, in order to watch a television that receives broadcasting signals transmitted by the NTSC, PAL, and/or SECAM systems using the interlaced scanning mode, the television must employ a display apparatus operable in the interlaced scanning mode. However, recent display apparatuses are mostly operable in the progressive scanning mode. Therefore, there is a need to convert interlaced scanning video signals into progressive scanning video signals so that a display apparatus operable in the progressive scanning mode may display the interlaced scanning video signals.

Figure 2:
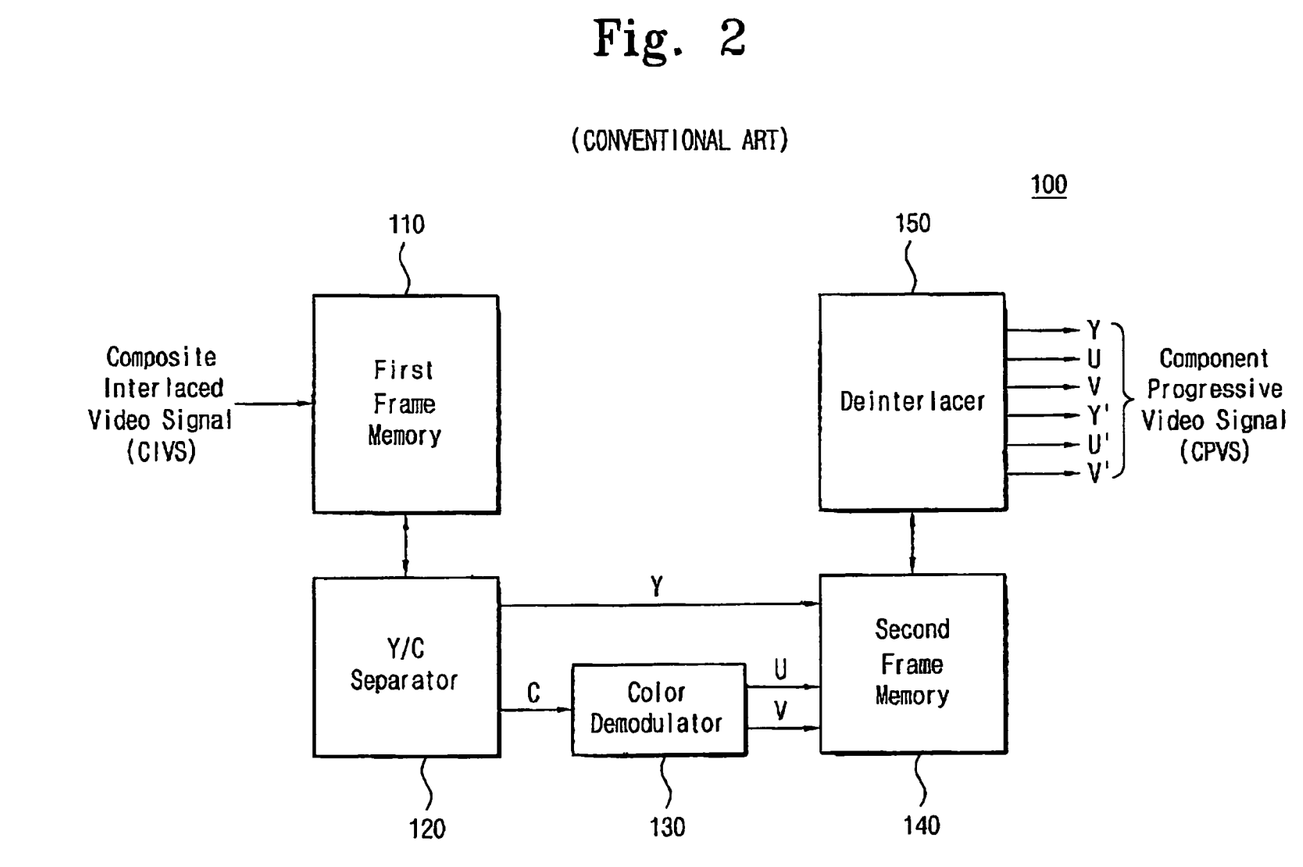
FIG. 2 is a block diagram showing a related art video signal processing apparatus.

FIG. 2 is a block diagram showing a conventional video signal processing apparatus. Referring to FIG. 2, the video signal processing apparatus 100 include a first frame memory 110, a Y/C separator 120, a color demodulator 130, a second frame memory 140, and a deinterlacer 150.

The first frame memory 110 accepts and stores a composite interlaced video signal (CIVS). The CIVS is also called a color, video, blanking, and sync (CVBS) signal.

The Y/C separator 120 accesses the first frame memory 110 and separates Y and C signals from the CIVS. Here, the Y represents a luma or luminance signal and C represents a chroma or chrominance signal. The Y/C separator 120 provides the luma (Y) signal to the second frame memory 140 and provides the chroma (C) signal to the color demodulator 130.

The color demodulator 130 receives the chroma (C) signal and determines horizontal (U) and vertical (V) signal components (or signals) of the chroma (C) signal. The color demodulator 130 provides the horizontal (U) and vertical (V) signals to the second frame memory 140.

The second frame memory 140 receives the luma (Y) signal from the Y/C separator 120; receives the horizontal (U) and vertical (V) signals from the color demodulator 130; and stores the luma (Y) signal, the horizontal (U) signal, and the vertical (V) signal.

The deinterlacer 150 reads data from the second frame memory 140 and then generates an interpolated Y signal (referred to in this application as the Y' signal), an interpolated U signal (referred to in this application as the U' signal), and an interpolated V signal (referred to in this application as the V' signal). Then, the deinterlacer 150 outputs a component progressive video signal (CPVS) composed of the Y, U, V, Y', U', and V' signals.

The video signal processing apparatus 100 shown in FIG. 2 separates the Y and C signals from the CIVS using the Y/C separator 120. And the video signal processing apparatus 100 generates the CPVS signal using the deinterlacer 150.

However, as illustrated in FIG. 2, the video signal processing apparatus 100 uses the first frame memory 110 for Y/C separation and the second frame memory 140 for deinterlacing. Using two frame memories in the video signal processing apparatus 100 increases cost. Further, since the procedure for processing a video signal requires accessing both the first frame memory 110 and the second frame memory 140, it takes a long time to process the video signal.

SUMMARY

Example embodiments may provide apparatuses and/or methods for processing video signals. Also, example embodiments may provide apparatuses and methods for processing operations to separate and/or deinterlace luminance and/or chrominance signals using a single frame memory.

According to example embodiments, a video signal processing apparatus may include a frame memory and/or a Y/C separator and deinterlacer circuit. The frame memory may store an interlaced video signal. The separator and deinterlacer circuit may execute Y/C separating and/or deinterlacing operations on the interlaced video signal stored in the frame memory. The apparatus may output a sequential video signal.

According to example embodiments, the video signal processing apparatus further may include a first color demodulator that receives a chroma (C) signal from the Y/C separating operation and/or determines horizontal and vertical component signals of the chroma (C) signal. The video signal processing apparatus also further may include a second color demodulator that receives an interpolated chroma (C') signal from the deinterlacing operation and/or determines horizontal and vertical component signals of the interpolated chroma (C') signal.

According to example embodiments of the apparatus, the sequential video signal may be composed of a luma (Y) signal, a chroma (C) signal, an interpolated luma (Y') signal, and/or an interpolated chroma (C') signal. Also, the sequential video signal may comprise a luma (Y) signal, a chroma (C) signal, an interpolated luma (Y') signal, and/or an interpolated chroma (C') signal. The frame memory may be implemented, for example, in a volatile memory. The Y/C separating and/or deinterlacing operations may be carried out at the same time and/or at different time(s). The Y/C separating and/or deinterlacing operations may be carried out with the same signal and/or different signal(s).

According to example embodiments, a data processing system may include the video signal processing apparatus discussed above.

According to example embodiments, a method for processing video signals may include storing an interlaced video signal in a frame memory; executing Y/C separating and/or deinterlacing operations on the interlaced video signal; and/or outputting a sequential video signal.

According to example embodiments, the method further may include receiving a chroma (C) signal from the Y/C separating operation and/or determining horizontal and vertical component signals of the chroma (C) signal. The method further may include receiving an interpolated chroma (C') signal from the deinterlacing operation and/or determining horizontal and vertical component signals of the interpolated chroma (C') signal.

According to example embodiments of the method, the sequential video signal may be composed of a luma (Y) signal, a chroma (C) signal, an interpolated luma (Y') signal, and/or an interpolated chroma (C') signal. Also, the sequential video signal may comprise a luma (Y) signal, a chroma (C) signal, an interpolated luma (Y') signal, and/or an interpolated chroma (C') signal. The frame memory may be implemented, for example, in a volatile memory. The Y/C separating and/or deinterlacing operations may be carried out at the same time and/or at different time(s). The Y/C separating and/or deinterlacing operations may be carried out with the same signal and/or different signal(s).

BRIEF DESCRIPTION OF THE DRAWINGS

The above and/or other aspects and advantages will become more apparent and more readily appreciated from the following detailed description of example embodiments taken in conjunction with the accompanying drawings, in which.

DETAILED DESCRIPTION OF EXAMPLE EMBODIMENTS

Example embodiments will now be described more fully with reference to the accompanying drawings. Embodiments, however, may be embodied in many different forms and should not be construed as being limited to the example embodiments set forth herein. Rather, these example embodiments are provided so that this disclosure will be thorough and complete, and will fully convey the scope to those skilled in the art. In the drawings, thicknesses of layers and regions may be exaggerated for clarity.

It will be understood that when an element is referred to as being "on," "connected to," or "coupled to" to another component, it may be directly on, connected to, or coupled to the other component or intervening components may be present. In contrast, when a component is referred to as being "directly on," "directly connected to," or "directly coupled to" another component, there are no intervening components present. As used herein, the term "and/or" includes any and all combinations of one or more of the associated listed items.

It will be understood that, although the terms first, second, third, etc., may be used herein to describe various elements, components, regions, layers, and/or sections, these elements, components, regions, layers, and/or sections should not be limited by these terms. These terms are only used to distinguish one element component, region, layer, and/or section from another element, component, region, layer, and/or section. For example, a first element, component, region, layer, and/or section could be termed a second element, component, region, layer, and/or section without departing from the teachings of the example embodiments.

Spatially relative terms, such as "beneath," "below," "lower," "above," "upper," and the like may be used herein for ease of description to describe one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

Figure 3:
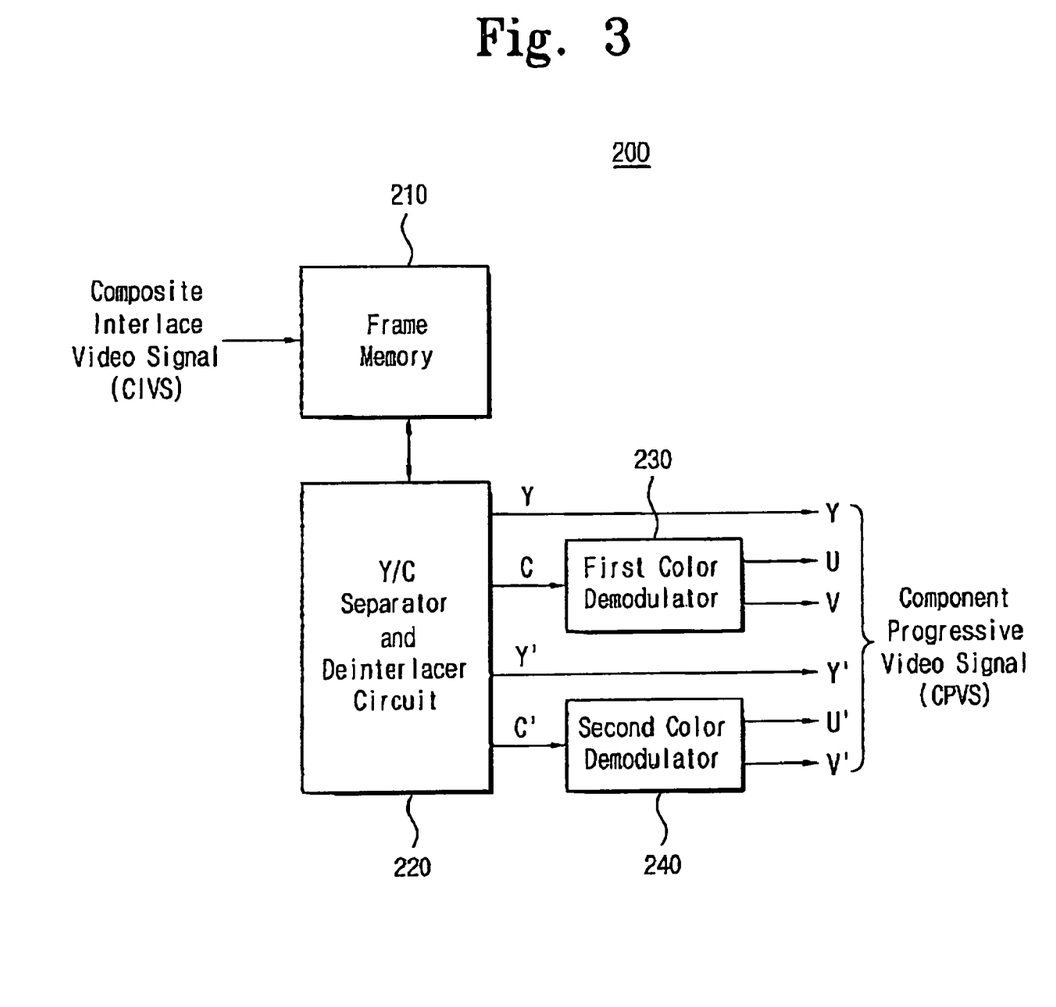
FIG. 3 is a block diagram illustrating a video signal processing apparatus according to an example embodiment.

FIG. 3 is a block diagram illustrating a video signal processing apparatus according to an example embodiment. Referring to FIG. 3, the video signal processing apparatus 200 may include a frame memory 210, a Y/C separator and deinterlacer circuit 220, a first color demodulator 230, and/or a second color demodulator 240. The video signal processing apparatus 200 may execute Y/C separating and deinterlacing operations using the frame memory 210 and/or the Y/C separator and deinterlacer circuit 220.

The frame memory 210 may accept a CIVS and may store interlaced scan data. The interlaced scan data also may be called field data. The frame memory 210 may receive a CIVS and may store the top and bottom field data.

The frame memory 210 may be implemented, for example, in a volatile memory that may be operable in random access mode. For example, the frame memory 210 may include dynamic random access memory (DRAM). The frame memory 210 may be accessible during the Y/C separating and deinterlacing operations.

The Y/C separator and deinterlacer circuit 220 may access the frame memory 210 and may separate Y and C signals from the CIVS. The Y/C separator and deinterlacer circuit 220 may conduct deinterlacing operation(s) to separate Y' and C' signals from the CIVS, in addition to the operation(s) to separate the Y and C signals. Here, Y represents luminance (or luma), while Y' represents interpolated luminance. Similarly, C represents chrominance (or chroma), while C' represents interpolated chrominance. The Y/C separating and deinterlacing operations may be executed at the same time and/or at different time(s). Operation of the Y/C separator and deinterlacer circuit 220 will be detailed later with reference to FIGS. 4A, 4B, and 4C.

The first color demodulator 230 may receive a C signal from the Y/C separator and deinterlacer circuit 220, and may determine horizontal (U) and vertical (V) component signals of the C signal. The first color demodulator 230 may output the horizontal (U) and vertical (V) component signals of the C signal. The second color demodulator 240 may receive a C' signal from the Y/C separator and deinterlacer circuit 220 and may determine interpolated horizontal (U') and vertical (V') component signals of the C' signal. The second color demodulator 240 may output the interpolated horizontal (U') and vertical (V') component signals of the C' signal.

The video signal processing apparatus 200 shown in FIG. 3 may transform the received CIVS signal into a CPVS signal. The video signal processing apparatus 200 may separate the Y and C components from the CIVS and further may separate and deinterlace the interpolated Y' and C' components from the CIVS. Because only a single frame memory is used, accessing the frame memory 210 may be faster and cost for fabricating the video signal processing apparatus 200 may be lower.

Figure 4A:
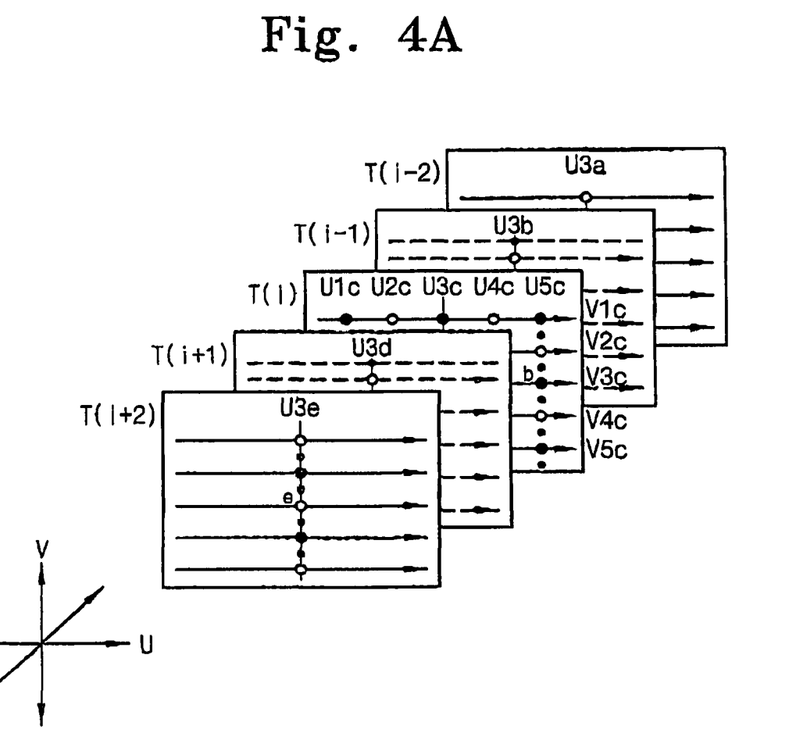
FIGS. 4A, 4B, and 4C are schematic diagrams illustrating operations of the Y/C separator and deinterlacer circuit of FIG. 3.
Figure 4B:
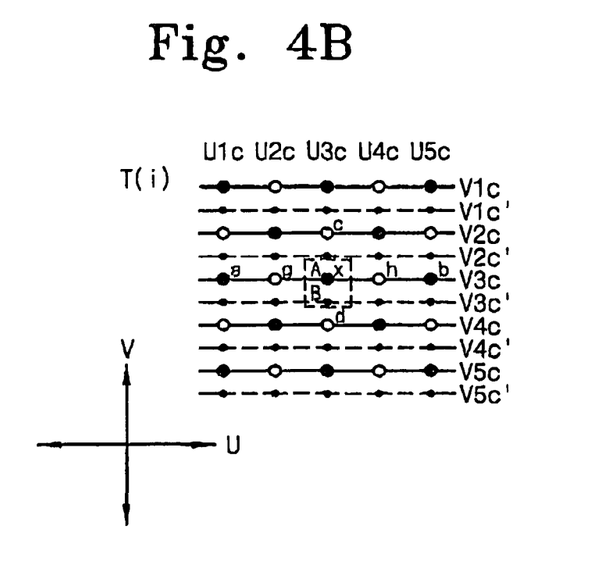
Figure 4C:
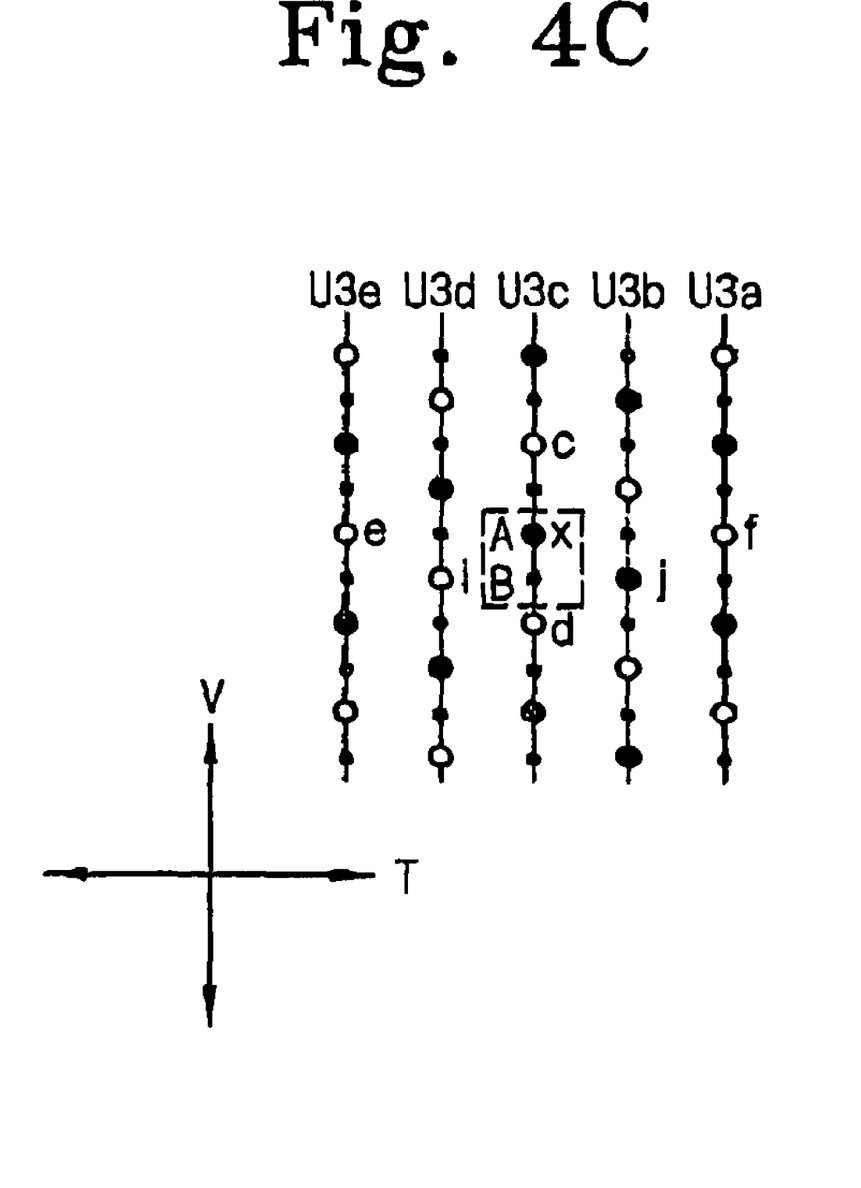

FIGS. 4A, 4B, and 4C are schematic diagrams illustrating operations of the Y/C separator and deinterlacer circuit of FIG. 3. FIGS. 4A, 4B, and 4C illustrate example interlaced scanning data stored in the frame memory 210 of FIG. 3. FIG. 4A illustrates example interlaced scanning data at times T(i−2) through T(i+2). FIG. 4B illustrates example interlaced scanning data on vertical and horizontal scanning lines at time T(i). FIG. 4C illustrates example interlaced scanning data of lines U3a through U3e at times T(i−2) through T(i+2).

In FIGS. 4A, 4B, and 4C, reference symbol V denotes the vertical direction while reference symbol U denotes the horizontal direction. FIGS. 4A, 4B, and 4C will be used to describe: (1) an example way of calculating the Y and C component signals at a point A where V3c meets U3c; and (2) an example way of calculating the Y' and C' component signals at a point B where V3c' meets U3c. In these ways, the video signal processing apparatus 200 of FIG. 3 may be able to execute the Y/C separating and deinterlacing operations, for example, at the same time using the frame memory 210.

First, an example way of calculating the Y and C signals at the point A will be described with reference to FIGS. 4B and 4C. The following Equation 1 shows the example way of calculating the Y and C signals at the point A.

$$Y = (d\min 1 == \text{diff}(a,b))?(g+2x+h)/4:(d\min 1 == \text{diff}(c,d))?(c+2x+d)/4:(d\min 1 == \text{diff}(e,f))?(e+2x+j)/4$$

$$C = (d\min 1 == \text{diff}(a,b))?(-g+2x-h)/4:(d\min 1 == \text{diff}(c,d))?(-c+2x-d)/4:(d\min 1 == \text{diff}(e,f))?(-e+2x-j)/4 \quad \text{[Equation 1]}$$

In Equation 1, dmin1=min(diff(a,b), diff(c,d), diff(e,f)). Here, diff(a,b) may represent a difference value between pixels a and b, and the term min(diff(a,b), diff(c,d), diff(e,f)) may represent the minimum of a difference value between pixels a and b, a difference value between pixels c and d, and a difference value between pixels e and f. The operator "?" denotes a conditional operation. For instance, (A?B:C) may mean that B is executed if A is satisfied, while C is executed when A is not satisfied.

The Y signal at the point A may be calculated as follows.

(Y1) If the minimum value dmin1 of the difference values between the pixels a and b, the pixels c and d, and the pixels e and f is equal to the difference value diff(a,b) between the pixels a and b, then Y=(g+2x+h)/4.

(Y2) If (Y1) is not satisfied and if the minimum value dmin1 of the difference values between the pixels a and b, the pixels c and d, and the pixels e and f is equal to the difference value diff(c,d) between the pixels c and d, then Y=(c+2x+d)/4.

(Y3) If (Y1) and (Y2) are not satisfied and if the minimum value dmin1 of the difference values between the pixels a and b, the pixels c and d, and the pixels e and f is equal to the difference value diff(e,f) between the pixels e and f, then Y=(e+2x+f)/4.

Similarly, the C signal at the point A may be calculated as follows.

(C1) If the minimum value dmin1 of the difference values between the pixels a and b, the pixels c and d, and the pixels e and f is equal to the difference value diff(a,b) between the pixels a and b, then C=(−g+2x−h)/4.

(C2) If (C1) is not satisfied and if the minimum value dmin1 of the difference values between the pixels a and b, the pixels c and d, and the pixels e and f is equal to the difference value diff(c,d) between the pixels c and d, then C=(−c+2x−d)/4.

(C3) If (C1) and (C2) are not satisfied and if the minimum value dmin1 of the difference values between the pixels a and b, the pixels c and d, and the pixels e and f is equal to the difference value diff(e,f) between the pixels e and f, then C=(−e+2x−f)/4.

Next, an example way of calculating the Y' and C' signals at the point B will be described with reference to FIGS. 4B and 4C. The following Equation 2 shows the example way of calculating the Y' and C' signals at the point B.

$$Y' = (d\min 2 == \text{diff}(c,d))?(x+d)/2:(i+j)/2$$

$$C' = (d\min 2 == \text{diff}(c,d))?(x-d)/2:(-i+j)/2 \quad \text{[Equation 2]}$$

In Equation 2, dmin2=min(diff(c,d), diff(e,f)).

The Y' signal at the point B may be calculated as follows.

(Y'1) If the minimum value dmin2 of the difference values between the pixels c and d and between the pixels e and f is equal to the difference value diff(c,d) between the pixels c and d, Y'=(x+d)/2.

(Y'2) If (Y'1) is not satisfied and if the minimum value dmin2 of the difference values between the pixels c and d and between the pixels e and f is equal to the difference value diff(e,f) between the pixels e and f, Y'=(i+j)/2.

Similarly, the C' signal at the point B may be calculated as follows.

(C'1) If the minimum value dmin2 of the difference values between the pixels c and d and between the pixels e and f is equal to the difference value diff(c,d) between the pixels c and d, C'=(x−d)/2.

(C'2) If (C'1) is not satisfied and if the minimum value dmin2 of the difference values between the pixels c and d and between the pixels e and f is equal to the difference value diff(e,f) between the pixels e and f, C'=(−i+j)/2.

Through these example ways, the Y/C separator and deinterlacer circuit 220 of FIG. 3 may separate and/or deinterlace the Y' and C' signals in addition to separating the Y and C signals. Therefore, the video signal processing apparatus 200 of FIG. 3 may conduct the Y/C separating and deinterlacing operations using the frame memory 210. The Y/C separating and deinterlacing method shown by FIGS. 4A, 4B, and 4C is illustrated as an example embodiment, but many other ways may be used.

For example, in Equation 1, the Y and/or C signals at the point A may be calculated by: (1) a weighted average of horizontal pixel values; (2) if not averaging horizontally, then a weighted average of vertical pixel values; or (3) if not averaging horizontally or vertically, then a weighted average of pixel values in time. Similarly, in Equation 2, the Y' and/or C' signals at the point B may be calculated by: (1) a weighted average of vertical pixel values; (2) if not averaging vertically, then a weighted average of pixel values in time.

In example embodiments, the weight values for the weighted averages may be changed, more values may be used, and/or different values (i.e., closer and/or further away from the point) may be used. In example embodiments, weighting may be only by horizontal pixel values, only by vertical pixel values, or only by time. In example embodiments, the ordering of the averaging may be changed (i.e., weighted in time first and/or weighted by horizontal pixel values last).

In example embodiments, the weight values may change depending on location in the top field, bottom field, or both. In example embodiments, the weight values may change depending on the horizontal scanning line, the vertical scanning line, and/or the time.

In example embodiments, a broadcaster and/or a viewer may have input to and/or control over some or all of the weight values. In example embodiments, the broadcaster and/or the viewer may have input to and/or control over some or all of the weight values using a system (i.e., RGB) different from the system in which the weight values are calculated (i.e., YUV).

In example embodiments, the weight values may change depending on manual and/or automated evaluation of the separating and/or deinterlacing operations. In example embodiments, the weight values may "learn" preferences of the viewer.

In example embodiments, the Y, C, Y', and/or C' signals at a point may be calculated using one or more horizontal pixel values, one or more vertical pixel values, and/or one or more pixel values in time.

In example embodiments, calculations other than the minimum difference value may be used. For example, mean value(s), median value(s), and/or mode value(s) may be used. Each may be weighted or unweighted. Each may use one or more horizontal pixel values, one or more vertical pixel values, and/or one or more pixel values in time.

Figure 5:
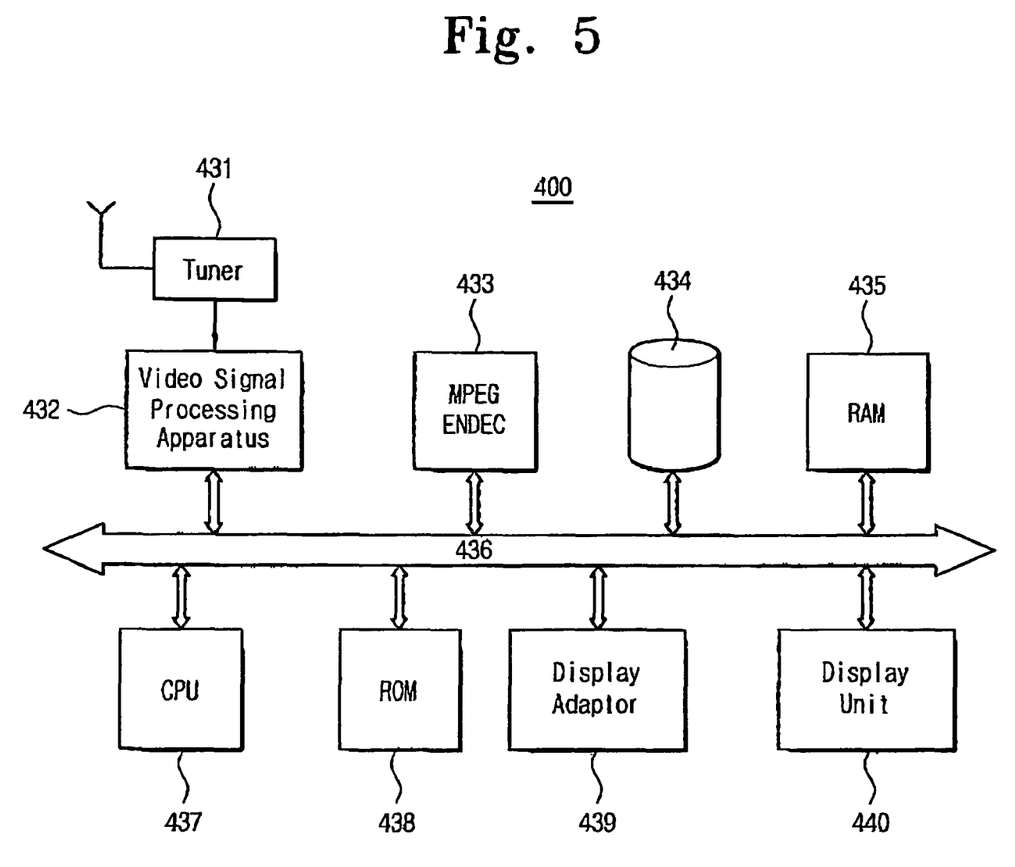
FIG. 5 is a block diagram illustrating a data processing system that may use the video signal processing apparatus according to an example embodiment.

FIG. 5 is a block diagram illustrating a data processing system that may use the video signal processing apparatus according to an example embodiment. Referring to FIG. 5, the data processing system 400 may include a central processing unit (CPU) 437. The CPU 437 may be connectable to various units, for example, by way of a system bus 436.

A read-only memory (ROM) 438 may be coupled to the system bus 436. The ROM 438 may include, for example, a basic input/output system (BIOS). A random access memory (RAM) 435 and/or a storage unit 434 also may be coupled to the system bus 436. The storage unit 434 may include, for example, a hard disc drive (HDD) and/or an optical disc drive (ODD).

A video signal processing apparatus 432 may be coupled to the system bus 436. The video signal processing apparatus 432 may receive broadcasting signals through a tuner 431 for processing video signals. A Moving Pictures Experts Group (MPEG) encoder/decoder (ENDEC) 433 also may be coupled to the system bus 436. And a display unit 440 may be connected to the system bus 436, for example, through a display adaptor 439.

As described above, the video signal processing apparatus may conduct the Y/C separating and deinterlacing operation using a single frame memory. Thus, it may be practical to reduce the number of frame memories, which may lower fabrication cost. Further, since only the single frame memory is accessed, it may be possible to shorten signal processing time.

While the example embodiments discuss a YUV system, other systems—such as YCbCr, YDbDr, YIQ, or YPbPr—may be used. Additionally, further systems—such as CIE LUV, CIE XYZ, CMY, HLS, HSB, HSV, or RGB—may be used. Although these further systems may not require a separation operation(s), all three of the signals (i.e., red, green, and blue for the RGB system) and/or all three of the separated and/or deinterlaced signals (i.e., R', G', and B') may require color demodulation in one, two, or more color demodulators.

While example embodiments have been particularly shown and described, it will be understood by those of ordinary skill in the art that various changes in form and details may be made therein without departing from the spirit and scope of the present invention as defined by the following claims.

What is claimed is:

1. A video signal processing apparatus, comprising:
   a frame memory;
   a separator and deinterlacer circuit;
   a first demodulator; and
   a second demodulator;
   wherein the frame memory is configured to store an interlaced video signal,
   wherein the separator and deinterlacer circuit is configured to execute operations of separating and deinterlacing the interlaced video signal stored in the frame memory,
   wherein the separator and deinterlacer circuit outputs a chroma signal and an interpolated chroma signal,
   wherein the separator and deinterlacer circuit outputs the chroma signal to the first demodulator,
   wherein the separator and deinterlacer circuit outputs the interpolated chroma signal to the second demodulator,
   wherein the first demodulator outputs a horizontal component signal of the chroma signal and a vertical component signal of the chroma signal, and
   wherein the second demodulator outputs a horizontal component signal of the interpolated chroma signal and a vertical component signal of the interpolated chroma signal.

2. The apparatus of claim 1, wherein the apparatus outputs a sequential video signal.

3. The apparatus of claim 1, wherein the separator and deinterlacer circuit is configured to calculate the chroma signal based on a weighted average of pixels of the interlaced video signal averaged one or more of horizontally, vertically, and temporally.

4. The apparatus of claim 2, wherein the sequential video signal is composed of a luma signal, the chroma signal, an interpolated luma signal, and the interpolated chroma signal.

5. The apparatus of claim 2, wherein the sequential video signal comprises a luma signal, the chroma signal, an interpolated luma signal, and the interpolated chroma signal.

6. The apparatus of claim 1, wherein the frame memory comprises a volatile memory.

7. The apparatus of claim 1, wherein the operations of separating and deinterlacing are carried out at a same time.

8. The apparatus of claim 1, wherein the operations of separating and deinterlacing are carried out with a same signal.

9. A data processing system, comprising the video signal processing apparatus of claim 1.

10. A data processing system, comprising the video signal processing apparatus of claim 2.

11. A data processing system, wherein the separator and deinterlacer circuit is configured to calculate the interpolated chroma signal based on a weighted average of pixels of the interlaced video signal averaged one or both of vertically and temporally.

12. A method for processing video signals, comprising:
storing an interlaced video signal in a frame memory;
executing operations of separating and deinterlacing the interlaced video signal stored in the frame memory;
receiving a chroma signal and an interpolated chroma signal from the operations of separating and deinterlacing;
determining horizontal and vertical component signals of the chroma signal;
determining horizontal and vertical component signals of the interpolated chroma signal; and
outputting the horizontal component signal of the chroma signal, the vertical component signal of the chroma signal, the horizontal component signal of the interpolated chroma signal, and the vertical component signal of the interpolated chroma signal.

13. The method of claim 12, further comprising:
outputting a sequential video signal.

14. The method of claim 12,
wherein the operations of separating and deinterlacing calculate the chroma signal based on a weighted average of pixels of the interlaced video signal averaged one or more of horizontally, vertically, and temporally, or
wherein the operations of separating and deinterlacing calculate the interpolated chroma signal based on a weighted average of pixels of the interlaced video signal averaged one or both of vertically and temporally.

15. The method of claim 13, wherein the sequential video signal is composed of a luma signal, the chroma signal, an interpolated luma signal, and the interpolated chroma signal.

16. The method of claim 13, wherein the sequential video signal comprises a luma signal, the chroma signal, an interpolated luma signal, and the interpolated chroma signal.

17. The method of claim 12, wherein the frame memory comprises a volatile memory.

18. The method of claim 12, wherein the operations of separating and deinterlacing are carried out with a same signal.

19. A video signal processor, comprising:
a frame memory;
a separator and deinterlacer circuit;
a first demodulator; and
a second demodulator;
wherein the frame memory is configured to store an interlaced video signal,
wherein the separator and deinterlacer circuit is configured to execute an operation of separating the interlaced video signal into a luma signal and a chroma signal and an operation of deinterlacing the interlaced video signal into an interpolated luma signal and an interpolated chroma signal,
wherein the separator and deinterlacer circuit outputs the luma signal and the interpolated luma signal,
wherein the separator and deinterlacer circuit outputs the chroma signal to the first demodulator,
wherein the separator and deinterlacer circuit outputs the interpolated chroma signal to the second demodulator,
wherein the first demodulator outputs a horizontal component signal of the chroma signal and a vertical component signal of the chroma signal, and
wherein the second demodulator outputs a horizontal component signal of the interpolated chroma signal and a vertical component signal of the interpolated chroma signal.

20. The video signal processor of claim 19,
wherein the separator and deinterlacer circuit is configured to calculate the luma signal based on a weighted average of pixels of the interlaced video signal averaged one or more of horizontally, vertically, and temporally,
wherein the separator and deinterlacer circuit is configured to calculate the chroma signal based on a weighted average of pixels of the interlaced video signal averaged one or more of horizontally, vertically, and temporally,
wherein the separator and deinterlacer circuit is configured to calculate the interpolated luma signal based on a weighted average of pixels of the interlaced video signal averaged one or both of vertically and temporally, or
wherein the separator and deinterlacer circuit is configured to calculate the interpolated chroma signal based on a weighted average of pixels of the interlaced video signal averaged one or both of vertically and temporally.

21. The video signal processor of claim 19, wherein the luma signal, the interpolated luma signal, the horizontal and vertical component signals of the chroma signal, and the horizontal and vertical component signals of the interpolated chroma signal compose a sequential video signal which is output from the video signal processor.

22. The video signal processor of claim 19, wherein the separator and deinterlacer circuit is configured to calculate the luma signal or the chroma signal based on pixels of the interlaced video signal by at least one of a weighted average of horizontal pixel values, a weighted average of vertical pixel values, and a weighted average of pixel values in time.

23. The video signal processor of claim 19, wherein the separator and deinterlacer circuit is configured to calculate the interpolated luma signal or the interpolated chroma signal based on pixels of the interlaced video signal by at least one of a weighted average of vertical pixel values and a weighted average of pixel values in time.

* * * * *